UNITED STATES PATENT OFFICE.

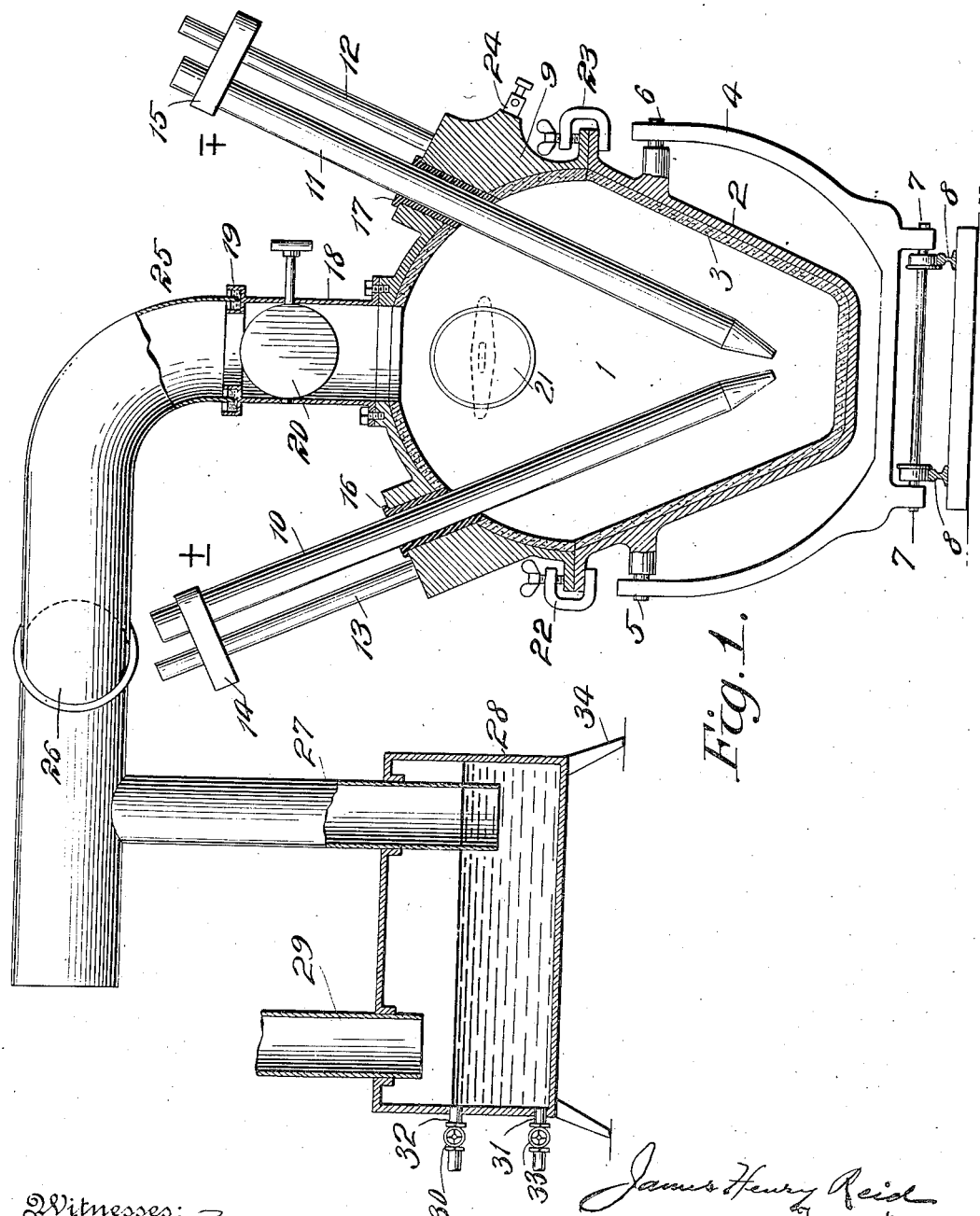

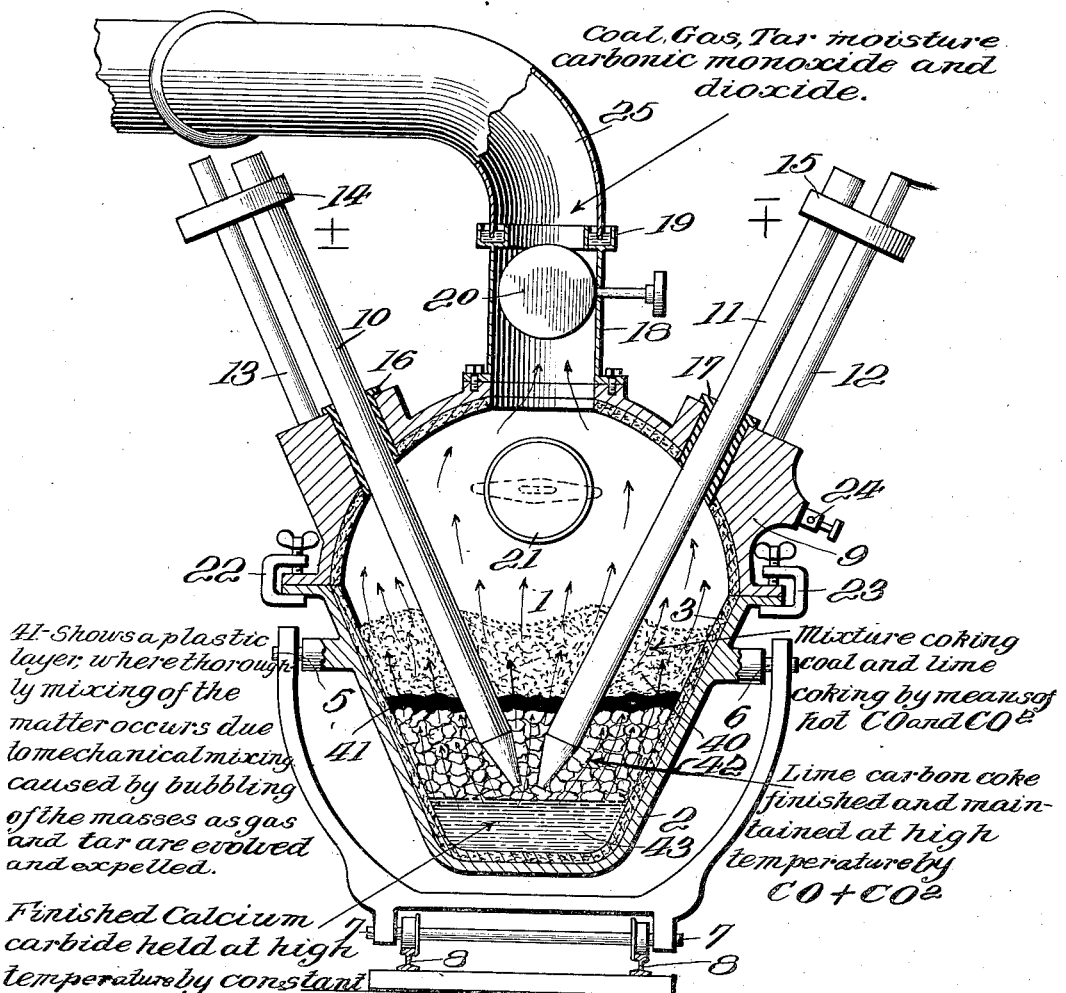

JAMES HENRY REID, OF NEWARK, NEW JERSEY, ASSIGNOR TO INTERNATIONAL NITROGEN COMPANY, A CORPORATION OF DELAWARE.

PROCESS OF PRODUCING CARBID.

1,327,736. Specification of Letters Patent. Patented Jan. 13, 1920.

Application filed March 15, 1913. Serial No. 754,461.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Producing Carbid, of which the following is a specification.

This invention relates to a process for the production of products from residues resulting from fractional or destructive distillation of coking coal, such as bituminous coal, or organic matter from which definite percentages of fixed carbon can be produced by destructive distillation, and the making of products with what would be the non-volatile carbonaceous residues or educts during the operation of the process, such as calcium carbid, which may be obtained by mixing calcium oxy-compounds, such as calcium oxid or substances capable of forming the same such as calcium carbonate, with bituminous coal and subjecting the mixture to the action of electricity as hereinafter set forth, and comprises specifically exposing coal of the bituminous variety to the action of electricity of sufficient volume and intensity to operate against the resistance of the substance employed and produce a temperature sufficient to evolve the product desired. The production of such by-products forms no essential part of the present invention.

Among the advantages of the process are that (1) a carbid of a high grade of purity may be produced in a uniform manner; (2) the rate of electrical current consumption is uniform; (3) the employment of the resistance instead of the arc principle results in great economy of current and materially prolongs the life of the electric furnace. The apparatus which I prefer to use and which is hereinafter described provides for great heat economy.

It is known that attempts have been made to produce cemented mixtures of lime and carbon by different methods. These attempts, however, produce masses of lime and carbon either of uncertain and uncontrollable composition or use crude materials other than lime and coking coal.

It is an obvious advantage to be able to control the composition of the material and it is one of the advantages of my process that I am able to obtain a mixture of known and definite composition from which I produce a carbid of a high grade of purity. By controlling the composition of the lime-coke mixture, I am able to use lime and coal in such proportions as to form a mixture of suitable composition for substantially complete conversion into carbid and carbon monoxid.

The apparatus herein described for carrying out this invention is of the form preferably used, but I do not wish to be confined to either this apparatus or to carrying out my process in one continuous operation. Any method by which a lime-carbon coke can be produced, containing any desired proportions of the lime and carbon and which will yield a lime-carbon coke firmly cemented into a hard coke like mass can be used.

The apparatus provides for the accumulation of the carbid formed at a point below the ends of the electrodes so that the ends of the electrodes are never immersed in the carbid.

The space around and between the electrodes is filled with the lime-coke material which completes the electrical circuit and is itself converted into carbid and carbon monoxid gas by means of the heat generated by its resistance to the electric current flowing through it. The carbid formed flows down to the bottom of the furnace and the carbon monoxid gas which is at a high temperature rises through the mass of material and the heat therefrom is utilized for the preparation of the crude material for the action of the electric current and a fresh portion of the material is brought into the zone of reaction either by moving the electrodes or by causing more of the material to fall into the space left by the reduction of the first portion.

The reaction for the production of carbid is $$CaO + 3C = CaC_2 + CO.$$

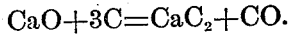

Therefore, nearly one-half pound of carbon monoxid is produced to each pound of carbid. The temperature of the gas as formed is substantially 2500° C. The heat contained in this gas is ample, not only to remove the last trace of volatile matter from the lime-carbon coke and heat it to a very high temperature, but also to coke the mixture of coking coal and lime.

Since the carbon monoxid can have no chemical reaction on carbon, it is an ideal heating agent for the preparation of the material, as none of the fixed carbon contained in the crude material will be removed by exposure to carbon monoxid at a high temperature. Therefore, a coke-lime material of definite and known composition may be produced.

As an illustration of the invention, and the manner in which it may be performed, the production of carbid, such as calcium carbid will be taken, reference being directed to the accompanying drawings, which diagrammatically indicate a form or character of apparatus adapted to the operation of the process.

Figure 1 of the drawings represents a transverse vertical view partly in section of an electric converter or furnace showing also means for collecting, condensing and securing the volatile and volatilized products if desired. Fig. 2 is a diagrammatic view illustrating the steps of the process.

Referring to the drawings, the numeral 1 represents an electric furnace in which the substances are converted, comprising the receptacle 2 provided with a lining 3 and supported by the support 4, by means of the trunnions 5 and 6, the said support 4 being provided with the roller bearing and shaft 7 resting on the track 8, whereby it may be rolled into and out of position after the materials in the receptacle 4 have been acted upon or converted. The receptacle 2 is provided with a top or cover 9 through which pass the electrodes 10 and 11 which are supported by the supports 12 and 13 through the insulation guides 14 and 15. The said electrodes pass through the cover 9 and are provided with the insulation sleeves 16 and 17. From the cover extends the outlet 18 provided with the fluid seal 19 and the revolving damper 20. The upper section or cover 9 is also provided with a sealed feed inlet 21, the seal of which may be removed and replaced while supplying ingredients to the apparatus and may be closed during the operation thereof. The lower section 2 and the upper section 9 are secured to each other by means of the screw clamps 22 and 23. The upper section of the converter is provided with a means 24 for providing an electrical connection to the converter opposite to that of the electrodes 10 and 11 and which means is attachable and detachable. The outlet 18 with its fluid seal 19 communicates with a removable conduit 25 operating through the swinging joint 26. This conduit communicates with an outlet 27 leading to the reservoir and through which the condensed volatile products may pass to the same. The reservoir 28 being provided with an outlet 29 for the permanent gases, whereby the said gases are conveyed to a reservoir (not shown). The reservoir 28 for the distillates is provided with the outlet 31 controlled by the valve 33 at the lower part thereof and the outlet 30 controlled by valve 32 at a higher point for removal of lighter products when the reservoir contains water. The reservoir 28 is also provided with the legs or supports 34.

Coking coal and calcium oxid in proper proportions are introduced into the receptacle 2 through the opening 21. It is advisable as a preliminary to starting the operation to add to this composition about 5% of powdered coke in order to reduce the initial resistance and provide a means for starting the passage of the electric current to produce highly heated carbon monoxid gas for the purpose of making lime-carbon coke from the mixture of coking coal and lime. The lime and coal may be thoroughly mixed before introducing them into the furnace although in the plastic state of the coal obtained during the coking process the resultant mass becomes homogeneous throughout.

When the mixture has been introduced into the apparatus the supply opening 21 is sealed and a current of electricity passed through the mixture by means of said electrodes and the contact 24 of the apparatus. As the current passes through the mixture of coal and lime, the heat generated by the resistance of the ingredients causes the evolution and distillation of various volatile products which condense and accumulate in reservoir 28 from which they may be recovered and the different ingredients afterward secured by fractional distillation if desired. The operations may be regulated by moving the electrodes through the insulating sleeves 16 and 17.

When all the volatile products have been distilled off the lime-carbon coke is heated to a high degree through the passage of electricity and thereby converted into calcium carbid which is finally removed from the receptacle 2 in any convenient manner as by removing the clamps 22 and 23 and the cover 9 with its electrodes and inverting the receptacle on its trunnions 5 and 6. The apparatus is then removed from its position and the cover 9 attached and the operation performed as before. The outlet 18 is provided with a damper 20 which may be regulated to suitably check the outflow of volatile products evolved during the operation of the process. The conduit 25 may be raised and disconnected from the fluid seal device 19 which seal is preferably maintained by means of a low fusible metal.

As a further illustration of a method for carrying out my invention, Fig. 2 shows a diagrammatic view of the furnace 2, in which 10, 11, represent electrodes having suitable attachments 14, 15, for connection to a source of electric current and passing into the interior of the furnace through insulated guides 16, 17. The charge is introduced through the cover and the current turned on, whereupon the electricity passes through the charge.

In this diagrammatic view 40 indicates the loose lime and coking coal mixture which is acted upon by the hot gas. The tar liberated from the mass 40 by the action of the hot gas tends to collect at 41 where the material is in a plastic condition. From this condition the material is converted into lime-carbon-coke, as shown at 42. This coke surrounds the ends of the electrodes and forms the resistant material through which the current passes. The action of this current converts the coked mass into carbid which falls to the lowest zone 43 entirely below the ends of the electrodes. Thus, the current never passes through the carbid but its path is confined to the zone of the coked material. As the level of the carbid rises the electrodes are raised to keep them clear of the carbid. The highly heated carbon monoxid rises through the coal lime mixture in the upper portion of the retort. During its passage it heats the material to a temperature sufficiently high to expel substantially all the volatile matter of the coal, whereby cemented masses of lime and coke are produced. This mixture is in an ideal condition for the production of carbid, since no segregation of the lime and carbon can occur. During the coking process the mass first becomes plastic, due to formation of tar and volatile hydrocarbons and, as the temperature of the mass gradually increases, the subsequent boiling and decomposition of the tar and hydrocarbons acts in a very efficient manner to mix the components of the mass.

By exposing organic matter, such as bituminous coal, to the action of electric currents and highly heated carbon monoxid gas, the substance will be transformed throughout in a regular and complete manner and will yield a larger percentage of products of more uniform character than in processes devised heretofore.

Other metal oxids may be employed instead of calcium, such as barium or other metal, a carbid of which is desired.

While I have herein described the particular steps of the process constituting the invention, and the particular order in which the steps may be carried out, and have also described the particular kind of apparatus in which the process may be performed, it is to be understood that the invention may be varied in details, both as to the process and the apparatus within the scope of the appended claims.

What I claim is:

1. The process of producing carbid which consists in coking suitable proportions of a metal oxid and organic material capable of yielding a definite percentage of fixed carbon such that after coking they are in proper proportion to produce carbid and passing an electric current through the coked mass to form carbid.

2. The process for the preparation of crude material and the manufacture of carbid therefrom which consists in causing the highly heated gas produced by the formation of carbid to pass through a mass of material consisting of a metal oxid and organic matter capable of yielding a definite percentage of fixed carbon until the mass is converted to a material suitable for reduction to carbid, then raising the temperature of the material by passing an electric current through the coked mass until conversion to carbid is substantially complete.

3. The process for the manufacture of carbid which consists in coking organic matter capable of yielding a definite percentage of fixed carbon with a metal oxid by means of the heat generated by resistance to the passage of an electric current and passing electricity through the coked mass until conversion to carbid is substantially complete.

4. The process of producing carbid which consists in coking suitable proportions of a metal oxid and organic matter capable of yielding a definite percentage of fixed carbon, passing an electric current through the coked mass whereby carbid is produced by the resistance of the material to the current and whereby further masses of material are coked by action of the gases of the carbid reaction on the oxid and organic material.

5. The process of making calcium carbid which consists in mixing lime and a suitable coking coal in such proportions that the fixed carbon of the coal will substantially suffice for the carbid forming reaction, coking said mixture and thereafter passing an electric current through the mixture to convert it into carbid.

6. The process of producing carbid which consists in coking coal and lime in suitable proportions to form a mass and generating sufficient heat to convert the coke lime to carbid, by causing an electric current to pass through the material.

7. The process of producing carbid which consists in coking coal and lime in suitable proportions to form a coke-like product containing the necessary carbon and lime for substantially complete conversion to carbid and carbon monoxid and passing an electric current through this coked material whereby the resistance of said material to the electric current produces heat sufficient to cause the substantially complete conversion of the mass to carbid and carbon monoxid.

8. The process of preparing cemented carbon and lime which consists in subjecting a mixture of coking coal and lime to the action of the hot gas formed by a carbid reaction occurring in operative relation thereto.

9. The process of manufacturing calcium carbid which consists in coking a charge or mass containing a mixture of coking coal and lime by means of hot gas produced by a carbid reaction occurring in operative relation thereto, producing calcium carbid from such coked charge or mass by means of electrical energy, and coking a fresh charge or mass containing coking coal and lime by means of the hot gas produced by the second carbid reaction.

10. In the manufacture of calcium carbid, the process which consists in mixing bituminous coal and lime, retorting the mixture to drive off the volatile constituents, and producing a coke-like product, then subjecting the compound thus obtained to extremely high heat.

11. The process of producing calcium carbid, which consists in mixing a coking coal and lime, retorting the mixture to drive off the volatile constituents, thus producing a coke-like product, then subjecting the material thus obtained to the action of an electric current.

12. The process of preparing cemented carbon and lime which consists in subjecting a mixture of lime and bituminous coal to the action of hot carbon monoxid gas produced by a carbid reaction formed therebeneath and in operative relation thereto.

13. The process of manufacturing calcium carbid which consists in coking a charge containing a mixture of bituminous coal and lime by means of hot carbon monoxid gas produced by a carbid reaction occurring therebeneath and in operative relation thereto, producing calcium carbid from such coked charge by means of electrical energy, and conducting the hot carbon monoxid gas produced by the second carbid reaction to a fresh charge or increment of bituminous coal and lime thereabove, thereby to coke such charge or increment.

14. In the manufacture of calcium carbid, the process of preparing carbid and cemented masses of coke and lime which consists in mixing lime and a suitable coking coal in proper proportions, coking said mixture, and then subjecting said coke and lime mixture to the action of an electric current for the production of calcium carbid.

15. The process of producing carbid which consists in retorting suitable proportions of a metal oxid and organic material capable of yielding a definite percentage of fixed carbon, such that after retorting they are in proper proportion to produce carbid and passing an electric current through the retorted mass to form carbid.

In testimony whereof I affix my signature in presence of two witnesses.

JAMES HENRY REID. [L. S.]

Witnesses:
   CHAS. C. LANE,
   ELMER E. SULLIVAN.